ENTRIKIN & DAVIS.
Harvester Cutter.
No. 19,920. Patented April 13, 1858.
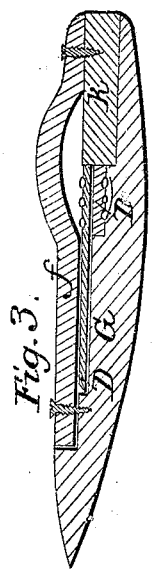
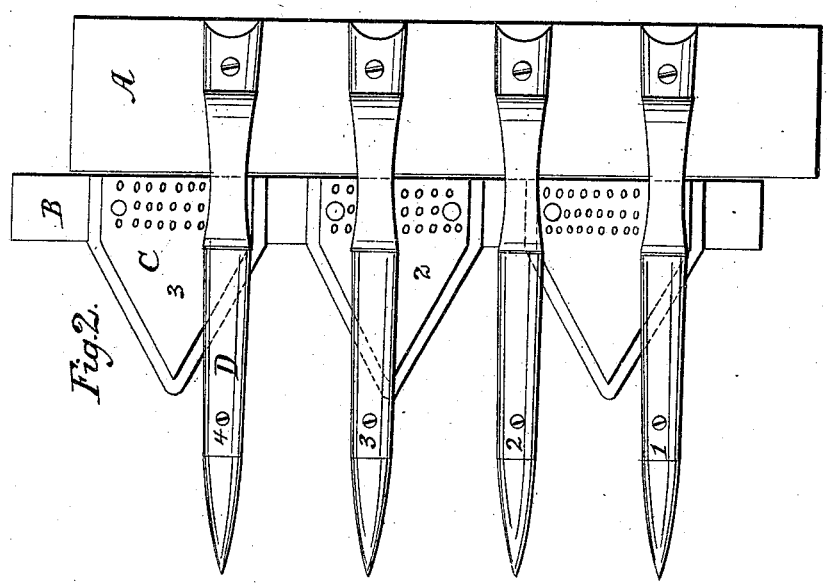
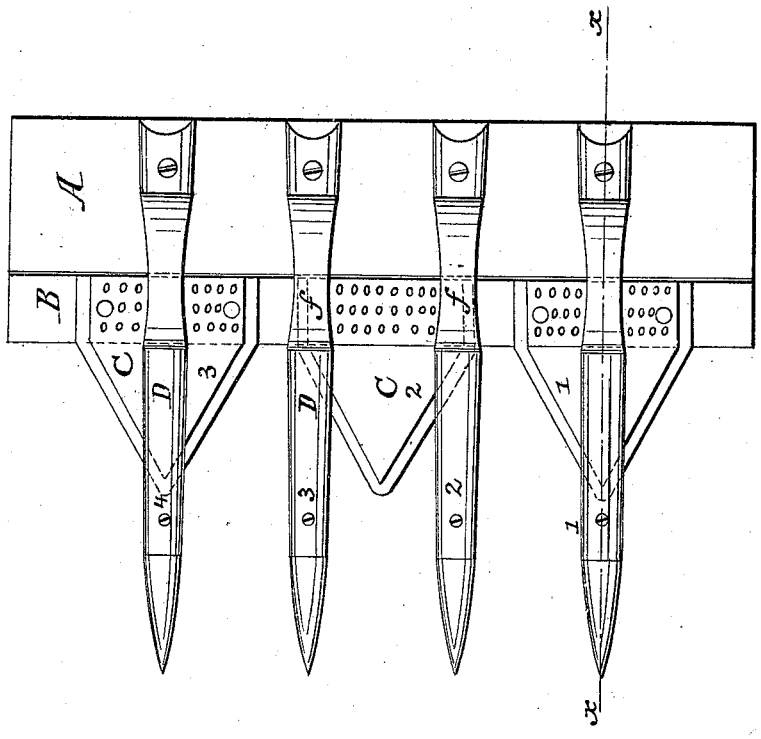

UNITED STATES PATENT OFFICE.

D. W. ENTRIKIN AND L. H. DAVIS, OF WEST CHESTER, PENNSYLVANIA.

IMPROVEMENT IN CUTTING DEVICES FOR HARVESTERS.

Specification forming part of Letters Patent No. 19,920, dated April 13, 1858.

*To all whom it may concern:*

Be it known that we, DAVIS W. ENTRIKIN and LEWIS H. DAVIS, of West Chester, in the county of Chester and State of Pennsylvania, have invented a new and useful Improvement in the Cutting Apparatus of Harvesters; and we do hereby declare that the following is a full, clear, and exact description of the construction and operation of the same, reference being had to the annexed drawings, forming part of this specification, in which—

Figure 1 is a top view of finger-bar and cutters, showing relative position of guard-fingers and cutters in a state of rest. Fig. 2 is a similar view, showing the alternate action of consecutive cutters. Fig. 3 is a section on line $xx$.

Similar characters of reference in the several figures denote the same parts.

Our invention consists in the combination of a peculiarly-hollowed guard-finger with a roughness of the cutter-bar for preventing clogging, the details of which will be hereinafter described.

In the drawings, A is the finger-bar. B is the cutter-bar. C C are the cutters, and D D are the fingers.

The upper portion, $f$, of the finger is hollowed and carried back upon the finger-bar, as shown in Fig. 3. The lower surface of the cutter-bar B and the portion of the upper surface of the cutters above the bar are roughened by indentations with sharp upward projecting edges. The finger under the cutter-bar is also hollowed out, as shown in Fig. 3. This hollowing out of the fingers permits the roughened surfaces of cutters and bar to carry from the fingers all substances likely to choke the cutters and prevent their free operation. The cutters C are so placed upon bar B and the fingers D so attached to finger-bar A that the following relation shall exist between the position of cutters and fingers: Taking the cutters in a state of rest and placing cutter 1 directly under finger 1, cutter 3 will be directly under finger 4 and cutter 2 will be midway between fingers 2 and 3, as shown in Fig. 1. When the bar B is moved cutter 1 is carried to a position directly under finger 3, and cutter 2 passes entirely through fingers 3 and 4 to a position midway between fingers 4 and 5, and so on throughout the series, each alternate cutter passing entirely through two fingers. This relation causes the cutting-edges of adjacent cutters to have a successive action, the edge of one cutter commencing operation as the edge of the cutter directly in front ceases to operate. This obviates the jerking action common to the usual construction of cutting apparatus. The passing of the cutters entirely through the teeth, as herein shown, serves to remove all foreign substances, which would otherwise tend to obstruct the operation of the cutters.

Having described our invention and the operation thereof, we claim—

In combination with the roughness upon the surface of cutter-bar and cutters, as described, arching the finger and extending it back upon the bar, and the hollowing out of the finger under the cutter-bar, the whole arranged and operating as and for the purpose set forth.

In testimony whereof we have hereunto signed our names before two subscribing witnesses.

DAVIS W. ENTRIKIN.
LEWIS H. DAVIS.

Witnesses:
GEO. PATTEN,
JOHN S. HOLLINGSHEAD.